(12) United States Patent
Sydow

(10) Patent No.: US 7,043,870 B1
(45) Date of Patent: May 16, 2006

(54) FISH ATTRACTANT DISPERSER

(75) Inventor: Lawrence P. Sydow, Salem, OR (US)

(73) Assignee: Sys Jigs and Flies, Inc., Salem, OR (US)

( * ) Notice: Subject to any disclaimer, the term of this patent is extended or adjusted under 35 U.S.C. 154(b) by 7 days.

(21) Appl. No.: 10/813,753

(22) Filed: Mar. 26, 2004

(51) Int. Cl.
*A01K 97/02* (2006.01)

(52) U.S. Cl. ................... 43/44.99; 43/42.06

(58) Field of Classification Search ........... 43/44.99, 43/44.2, 42.06
See application file for complete search history.

(56) References Cited

U.S. PATENT DOCUMENTS

| | | | | |
|---|---|---|---|---|
| 2,295,042 A | * | 9/1942 | Llewellyn | 43/35 |
| 2,465,127 A | * | 3/1949 | Stark | 43/44.99 |
| 2,713,744 A | | 7/1955 | Strausser | |
| 2,741,864 A | * | 4/1956 | Shotton | 43/44.9 |
| 2,749,647 A | * | 6/1956 | Beloff | 43/42.06 |
| 2,769,268 A | * | 11/1956 | Miller | 43/42.06 |
| 2,844,907 A | * | 7/1958 | Merton | 43/44.99 |
| 3,780,467 A | | 12/1973 | Lueck | |
| 4,205,476 A | * | 6/1980 | Hsu | 43/42.06 |
| 4,449,318 A | | 5/1984 | Lane | |
| 4,696,125 A | | 9/1987 | Rayburn | |
| 4,799,328 A | | 1/1989 | Goldman | |
| 4,817,326 A | | 4/1989 | Benjestorf | |
| 4,930,245 A | | 6/1990 | Bazzano | |
| 5,428,921 A | | 7/1995 | Lancieri | |
| 5,560,140 A | | 10/1996 | Nafziger et al. | |
| 5,729,928 A | | 3/1998 | Anderson | |
| 6,035,574 A | * | 3/2000 | Ware | 43/42.06 |
| 6,079,145 A | * | 6/2000 | Barringer | 43/42.06 |
| 6,516,554 B1 | | 2/2003 | Page et al. | |
| 6,588,138 B1 | * | 7/2003 | Gilbert | 43/42.06 |

FOREIGN PATENT DOCUMENTS

| | | | |
|---|---|---|---|
| WO | WO8907393 | * | 2/1989 |
| WO | WO9001264 | * | 8/1989 |

OTHER PUBLICATIONS

Photograph of Ad-just-a-bubble prior art device.
Photograph of Underwater Suspension Apparatus prior art device.
Document entitled Explanation of Ad-just-a-bubble and Underwater Suspension Apparatus.

* cited by examiner

*Primary Examiner*—Michael Carone
*Assistant Examiner*—Bret Hayes
(74) *Attorney, Agent, or Firm*—Klarquist Sparkman LLP

(57) ABSTRACT

A fish dispensing apparatus comprises first and second housing sections which interfit with one another. One or more fish dispensing openings communicate from the interior of the housing sections to the exterior thereof for distribution or dispersment of fish attractant through the openings when the openings are in open condition. A closure is desirably provided to respectively close the openings a desired amount. A rigid passageway may be defined through the body by passageway members of the respective housing sections.

21 Claims, 2 Drawing Sheets

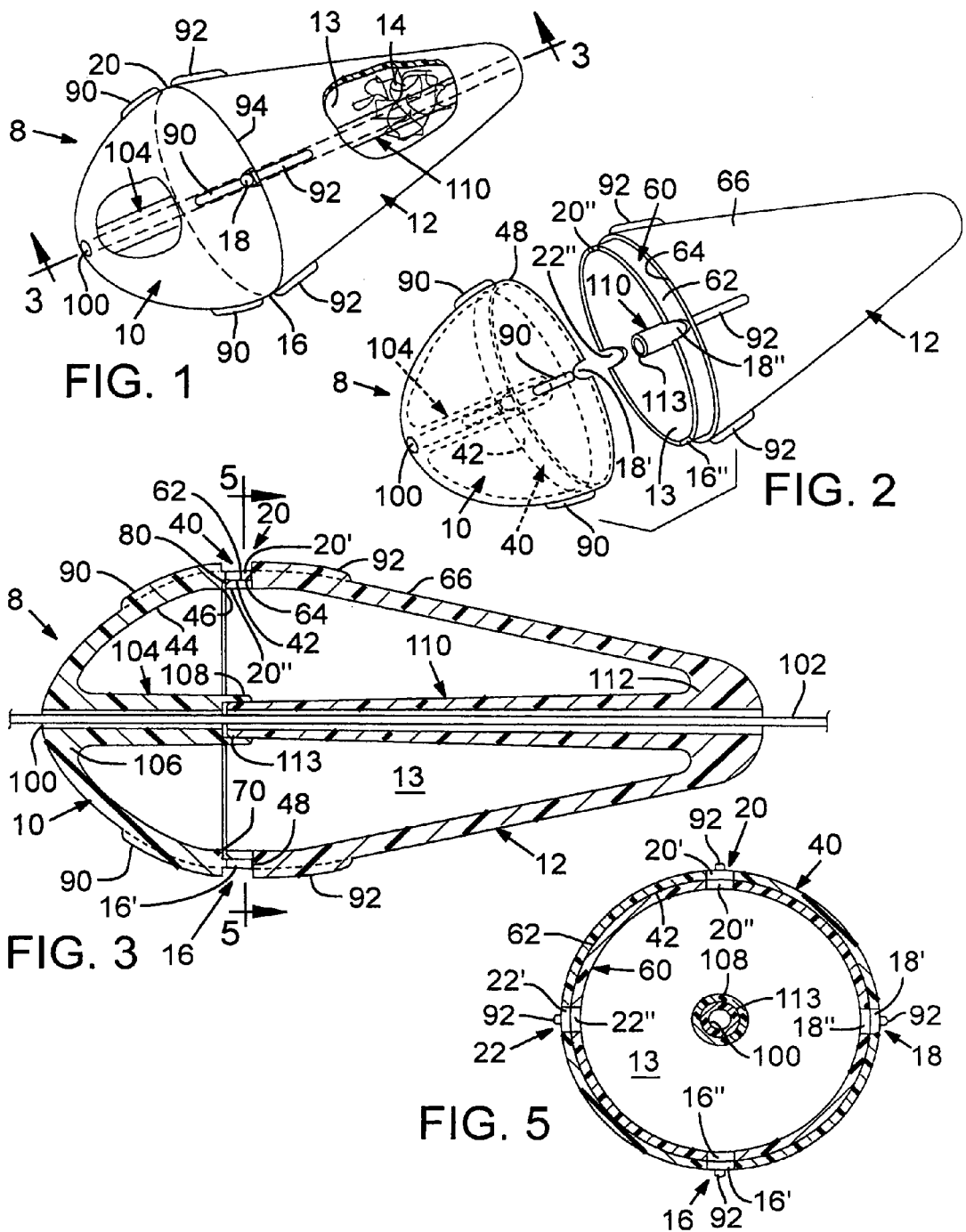

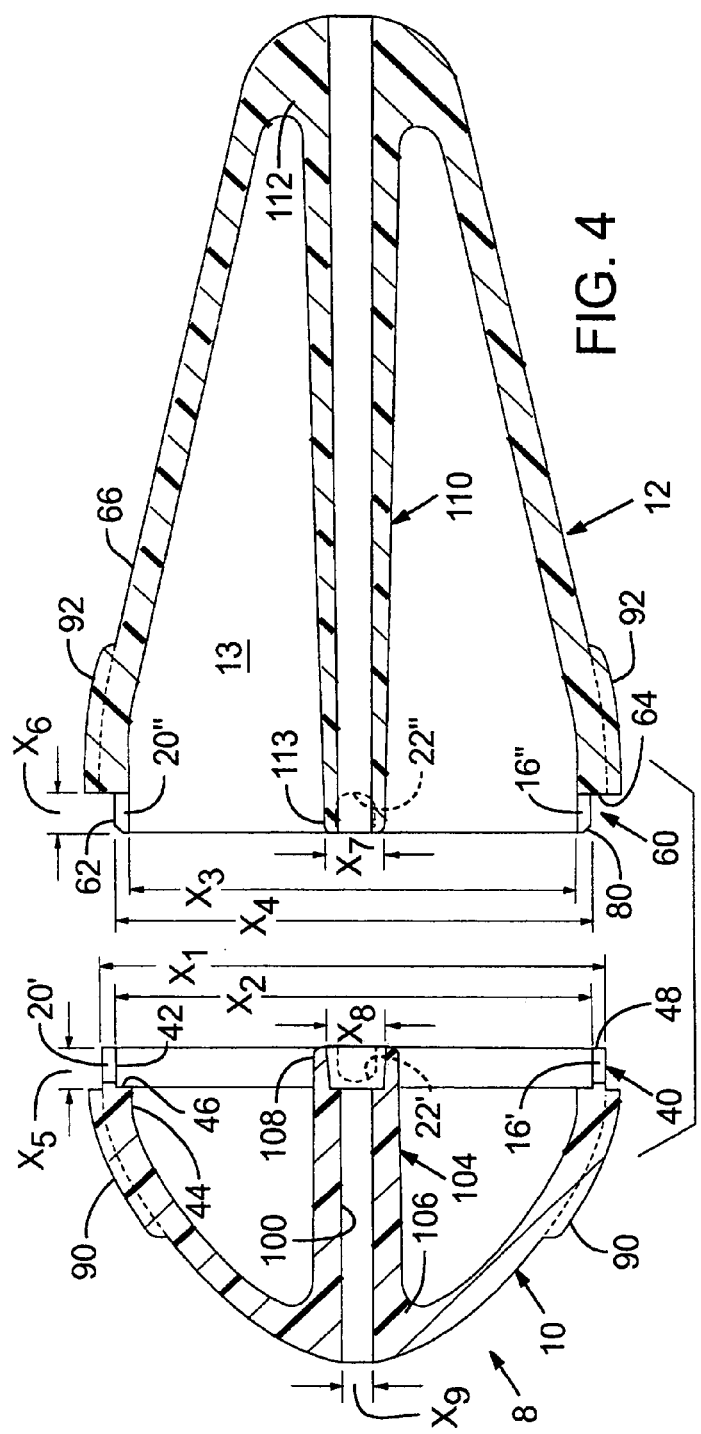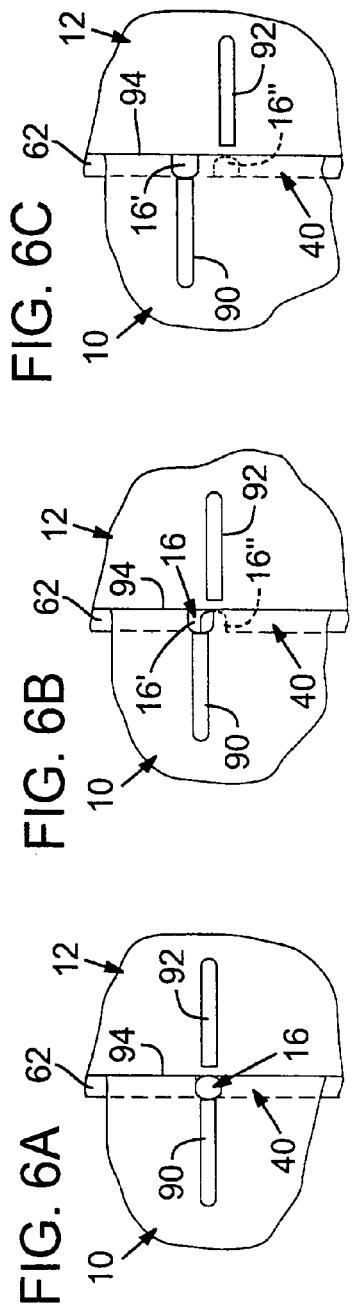

FISH ATTRACTANT DISPERSER

TECHNICAL FIELD

The technology disclosed herein relates to dispensing fish attractant, such as fish attracting scents which bleed into water to attract fish during fishing.

BACKGROUND

There are a number of fish attractants that are commercially available. These fish attractants may be in the form of solid or semi-solid materials that leach fish attracting scents into water when placed in water. Alternatively, attractants may be solutions of one or more chemicals, natural materials, or mixtures of materials which are deposited on cotton, foam or other holding materials. The attractants leach or disperse into water when the attractant holding materials are exposed to water. Since many target fish are very sensitive to smell, water can carry the scents to where fish are located with the fish then following the scent back to a baited hook or other lure.

Although a number of devices are known for use in dispensing fish attractant, a need nevertheless exists for an improved apparatus for this purpose.

SUMMARY

In accordance with one embodiment, an apparatus for dispensing fish attractant comprises a body. The body comprises first and second housing sections which are detachably interconnected. The body also comprises a fish attractant containing receiving area or chamber for receiving fish attractant. For example, one or more fish attractant containing pellets or substances may be placed in the chamber. Alternatively, a foam, cotton or other holding material may receive drops of fish attractant solution for dispersment. At least one fish attractant dispersing opening communicates from the chamber and to the exterior of the housing. As a result, when the housing is placed in water, fish attractant may pass through the opening and into water for fish attracting purposes. Desirably, the first and second housing sections comprise respective first and second passageway defining members. The passageway defining members may interfit with one another when the first and second housing sections are interconnected to define a passageway from the exterior of the body, through the body, and to the exterior of the body. A fishing line or other device, such as a connector, may be inserted through the passageway to, for example, connect the fish attractant dispensing apparatus to a fishing line.

In accordance with an embodiment, the first and second housing sections may be pivotable relative to one another when they are interconnected. A closure may be provided which is movable as the first and second housing sections pivot relative to one another. Desirably, the closure may be shifted to a closed position at which the closure blocks and closes the at least one fish attractant dispersing opening The closure may also be shifted to at least one second open position, and preferably to a plurality of second open positions, at which the closure at least partially does not block the at least one fish attractant dispersing opening. When the closure is in a second position, the at least one fish attracting dispersing opening is at least partially open to permit the dispersment of fish attractant through the opening from the chamber. The various second open positions, may vary one from another by the extent to which the closure blocks the at least one fish attractant dispersing opening.

The first and second housing sections may comprise indicia for visually indicating the extent to which the at least one fish attractant dispersing opening is open.

In a specific exemplary embodiment, the first housing section may comprise a first visual indicia and the second housing section may comprise a second visual indicia. The respective first and second visual indicia may shift relative to one another as the first and second housing sections pivot relative to one another. The relative positions of the first and second visual indicia in this embodiment indicate the position to which the first and second housing sections have shifted and also indicate the extent to which the at least one fish attractant dispersing opening is open.

The first and second housing sections may interfit and pivot relative to one another along a joint extending about the periphery of the body. For example, in a desirable form the joint extends about a central portion of the body. The respective first and second visual indicia may be carried by the respective first and second housing sections at respective locations adjacent to the joint. These indicia may comprise raised projections.

In addition, in a desirable approach, the first visual indicia, a first passageway defining member, and the first housing are all formed together, such as being molded of plastic. In addition, the second visual indicia, a second passageway defining member, and the second housing section may also be formed together, such as being molded of plastic.

As another feature of an embodiment, the first and second passageway defining members may be elongated members, and may be tubular in form. The first passageway defining member may have a base connected to an interior surface of the associated housing section and a distal end portion spaced from the base. The second passageway defining member may also have a base connected to an interior surface of a housing section and a distal end portion spaced from the base. One of the distal end portions may be sized for insertion into a receiving portion of the other distal end portion when the first and second housing sections are interconnected. In this embodiment, the completed passageway extends from the exterior of the first housing section, through the base of the first passageway defining member, through the first passageway defining member and the distal end portion thereof, through the distal end portion of the second passageway defining member, through the second passageway defining member and the base thereof, and through the second housing section to the exterior of the body.

One of the first and second housing sections may also comprise a first peripheral lip which has an interior engagement surface. The other of the first and second housing sections may comprise a second peripheral lip with an exterior engagement surface. The interior and exterior engagement surfaces desirably engage one another when the first and second housing sections are interconnected. For example, one of the first and second housing sections may be inserted into the other of the first and second housing sections with the engagement surfaces abutting one another upon this interconnection. Desirably, the engagement surfaces are generally annular in shape. One of the housing sections may comprise a stop to limit the extent of insertion of the other of the housing sections therein.

In a desirable embodiment, the first and second lips define plural fish attractant dispersing openings which are completely out of alignment with one another when the first and second housing sections are in a closed position to thereby block the flow of fish attractant through the fish attractant dispersing openings. In contrast, the fish attractant dispersing openings of the respective lips are at least partially aligned when the first and second housing sections are pivoted to a fish attractant dispersing open position to provide a path for dispersing fish attractant from the interior of the assembled housing sections and through the at least partially aligned fish attractant dispersing openings. The extent of alignment of the respective openings of the first housing section with those of the second housing section may be varied to vary the extent to which the fish attractant dispersing openings are open.

The present invention is directed toward all new and non-obvious features of a fish attractant dispensing apparatus disclosed herein both alone and in various combinations and sub-combinations with one another.

BRIEF DESCRIPTION OF THE DRAWINGS

FIG. 1 is a perspective view of an embodiment of a fish attractant disperser shown partially broken away.

FIG. 2 is a perspective view of the embodiment of FIG. 1 with first and second housing sections separated from one another.

FIG. 3 is a longitudinal sectional view of the embodiment of FIG. 1, taken along lines 3—3 of FIG. 1.

FIG. 4 is an embodiment like that shown in FIG. 3 with the two housing sections shown separated from one another.

FIG. 5 is a transverse sectional view of the embodiment of FIG. 1, taken along lines 5—5 of FIG. 3.

FIGS. 6A through 6C illustrate portions of an embodiment of a fish attractant dispersing apparatus with the fish dispersing opening shown in various conditions, namely, open, partially open, and closed.

DETAILED DESCRIPTION

With reference to the figures, the illustrated embodiment of a fish attractant disperser comprises a body 8. Body 8 comprises first and second housing sections or components 10, 12 which desirably interfit while permitting relative rotation of the housing sections about a longitudinal axis of the overall body. Although these components may snap fit together along a groove or other interfitting connection, in one desirable approach, a friction fit is utilized with friction holding the housing sections 10, 12 together while still permitting their relative rotation.

The illustrated embodiment of these figures shows a body 8 formed of two housing components or sections 10, 12. These housing sections need not be of the configurations shown in these figures. In addition, each of the housing sections may comprise a plurality of interconnected section forming members. However, in a particularly desirable approach, the housing sections are each formed as a monolithic unitary one-piece unit, such as being molded of plastic with PVC being a specific exemplary plastic. The housing sections may be transparent, semi-transparent, or colored as desired. Other components of each housing section may be molded as a unit with the associated housing section. Alternatively, components of the housing sections may be separately formed and adhesively or otherwise joined together, but this is less desirable.

As can be seen in FIG. 2, the housing sections 10, 12 may be separated to provide access to an interior of the housing which may comprise one form of a chamber 13 or fish attractant receiving area. Fish attractant may be placed in the chamber. For example, foam, cotton, or other fish attractant holding material, such as indicated at 14 in FIG. 1, may be placed in the chamber 13. Fish attractant solution may be dispensed onto the holding material for subsequent dispersal into a fish attractant disperser when the apparatus is in use.

At least one fish attractant fish dispersing opening is provided and, when open, communicates between the interior of the housing and the exterior of the body. More desirably, a plurality of such openings are provided. For example, four such openings may be provided and spaced equal distance about the periphery of the body 8. Three of these openings are indicated in FIG. 1 by the numbers 16, 18, and 20, with these openings being shown in an open position in FIG. 1. A fourth such opening 22 is shown in FIG. 5.

A closure mechanism may be provided for selectively closing the openings. When closed, the closure mechanism substantially impedes the passage of fish attractant through the openings when closed. More desireably, when closed, the interior of the body, or fish attractant containing chamber included as part of the body, is totally sealed. For example, the openings may be closed when the apparatus is being transported in a vehicle or tackle box to retain the scent within the interior of the body. A closure mechanism which operates independently of the rotation of the housing sections may be used and the openings may be located elsewhere than shown in these figures. However, desirably, the closure mechanism is operated by rotating the housing sections 10, 12 relative to one another to shift the closure mechanism from a position in which the openings are closed to various other positions wherein the openings are opened with the extent of opening being dependant upon the relative rotational positions of the housing sections.

As a specific example, housing section 12 may comprise a first lip 40 which extends about the periphery of the body 8 at a location spaced from the end of the body, such as shown in FIGS. 2 and 3. The illustrated form of lip 40 defines a first engagement surface 42 which desirably comprises an annular engagement surface. Engagement surface 42 may be recessed into an interior surface 44 (FIG. 3) of the housing section 10 and thus has an enlarged diameter $x_2$ (FIG. 4) relative to the diameter of the housing section 10 immediately adjacent to the surface 42, although this is not required. A shelf 46, which may also be annular, extends inwardly from interior surface 44 to the base of surface 42. A plurality of spaced apart openings are defined in lip 40 in the embodiment of FIG. 3. These openings are designated 16', 18', 20', and 22' in FIGS. 2, 3, and 5. The "'" designation indicates that the particular opening in lip 40 forms a portion of the corresponding fish attractant dispersing opening with the same number. Thus, when in an open position, the illustrated four fish attractant dispersing openings are indicated as 16, 18, 20 and 22 in FIG. 5. The portions of such openings through lip 40 are thus indicated in FIG. 5 as 16', 18', 20', and 22'. The end or base of lip 40 in this embodiment, designated as 48 in FIGS. 2 and 3, comprises a peripheral end or edge of body section 10.

In addition, in this embodiment the housing section 12 also defines a peripheral lip 60, desirably extending about the entire periphery of the body section 12. Lip 60 defines an engagement surface 62 which is desirably annular in shape. The surface 62 is inset or recessed into an outer surface 66 of housing section 12. Thus, the diameter $x_4$ (FIG. 4) of surface 62 is less than the diameter of the adjoining portion of surface 66. An annular shelf 64, extends from surface 66 to the base of surface 62. Desirably, lip 62 is slightly shorter than lip 40. In this case, when the housing sections 10, 12 are interconnected, such as shown in FIG. 3, the base 48 of lip 40 engages the shelf 64 of lip 60 and limits the insertion of housing section 12 into housing section 10. Thus, a gap 70 exists between the distal end of lip 60 and the shelf 46. Desirably, the diameter of surface 62 is slightly greater than the diameter of surface 42. Also, the exterior or radially outward corner of the distal end of lip 60 may be rounded or chamfered as indicated at 80. With this construction, lip 40 is expanded in diameter slightly as housing section 12 is inserted into housing section 10 with surfaces 42 and 62 engaging one another. This provides a snug fit between these housing sections and provides a friction fit between these housing sections to assist in maintaining them together while permitting their relative rotation.

Like lip 40, the lip 60 of housing section 12 is desirably provided with a plurality of fish attractant dispersing or dispensing openings indicated in FIGS. 2 and 5, respectively, by the numbers 16", 18", 20", and 22". When these openings in lip 60 are fully aligned with corresponding openings in housing section 10, such as shown in FIG. 5 (opening 16' being aligned with opening 16", opening 18' being aligned with opening 18", opening 20' being aligned with opening 20", opening 22' being aligned with opening 22"), the respective openings 16, 18, 20 and 22 are fully open. When housing sections 10 and 12 are rotated relative to one another to misalign the associated opening forming portions in each of the respective lips, the openings are closed to the extent of the misalignment. With the construction shown in FIG. 5, the housing sections may be rotated 90 degrees relative to one another and openings will again be aligned.

Visual indicia may be provided on body 8 to indicate the extent of alignment of the openings of the respective housing sections and thus the opened and/or closed condition of the fish attractant dispersing openings. The visual indicia may take any convenient form and may provide a graphical indication of the alignment. In the embodiment shown in FIGS. 1 through 5, an elongated visual indicator, such as a projecting ridge which is elongated in a length-wise direction of body 8, is provided adjacent to each of the opening defining voids of the respective lips. In FIGS. 1, 2, 3, and 5, the respective indicia on housing section 10 are each indicated by the number 90. In contrast, the indicia on housing section 12 are each indicated by the number 92. When the housing sections 10, 12 are assembled, a joint 94 is provided and extends about the periphery of the body 8. (See FIG. 1).

With reference to FIGS. 6A, 6B, and 6C, the illustrated form of visual indicators and the operation thereof will become readily apparent. In FIG. 6A, the indicia 90 is aligned with indicia 92 and opening forming void 16' is aligned with opening forming void 16" to form a fully open fish scent dispersing opening or aperture 16. In FIG. 6B, housing section 10 and housing section 12 have been rotated relative to one another a distance which is less than the full dimension of the fully opened fish scent dispersing opening 16. In FIG. 6B, one can see that fish attractant dispersing opening 16 is only partially opened. Thus, in FIG. 6B, the opening defining portion 16' of lip 40 has been shifted upwardly relative to the opening defining portion 16" of lip 62. In this case, indicia 90 and indicia 92 are slightly misaligned. In FIG. 6C, further relative rotation of these housing sections 10, 12 has taken place. In this case, there is no opening 16 as opening forming portion 16' and opening forming portion 16" are totally misaligned from one another.

Referring again to FIGS. 1 and 2, the housing sections 10, 12 desirably comprise respective passageway defining members. These members define an internal passageway 100 which extends, in this example, lengthwise from the exterior of the body (exteriorly of housing section 10, through the interior of the body, and to the exterior of the body, e.g., through housing section 12). A fishing line or other connector 102 may pass through the passageway 100. The respective passageway defining members may comprise a tubular projection 104 having a base portion 106 projecting from the interior surface 44 of housing section 10. Member 104 desirably extends lengthwise along the longitudinal axis of body 8. Passageway defining member 104 comprises a distal end portion 108. In a similar manner, a passageway defining member 110, which may be of a tubular configuration as shown in these figures, has a base portion 112 projecting from an interior of housing section 12 and extending into the interior of the body. Member 110 may have a distal end portion 113. Distal end portion 108 may define a receptacle sized for receiving a portion of the distal end portion 113, as shown in FIG. 3. The interior surface of the receptacle of distal end portion 108 may be frusto-conical in configuration. In addition, the exterior surface of member 110 may taper moving from the base 112 toward distal end 113 with the diameter of member 110 decreasing moving away from base 112. When interconnected in this manner, the passageway 100 is enclosed by the respective tubular members 104, 110 through the entire interior of the body.

Although the dimensions may vary, exemplary dimensions for a specific illustrative embodiment are given in the table below with reference to FIG. 4.

TABLE

| Distance | Dimension (in inches) |
|---|---|
| $x_1$ | 1.1885 |
| $x_2$ | 1.120 |
| $x_3$ | 1.048 |
| $x_4$ | 1.120 |
| $x_5$ | 0.110 |
| $x_6$ | 0.095 |
| $x_7$ | 0.1425 |
| $x_8$ | 0.1458 |
| $x_9$ | 0.078 |

In this specific example, the diameter of a fully opened scent dispensing aperture is 0.095 in.

The illustrated body 8 in FIG. 1 is generally ovoid or ovoidal in shape, or torpedo shaped. Again, the body may take on other shapes and dimensions.

Having illustrated and described the principles of our invention with reference to several embodiments, it should be apparent to those of ordinary skill in the art that the invention may be modified in arrangement and detail without departing from such principles. We claim as our invention all such modifications as fall within the scope and spirit of the following claims.

I claim:

1. An apparatus for dispensing fish attractant comprising:
   a body having an exterior and comprising first and second housing sections, the first and second housing sections being detachably interconnected, the body comprising a fish attractant receiver;
   at least one fish attractant dispersing opening communicating from the receiver and to the exterior of the body;
   the first and second housing sections comprising respective first and second fishing line receiving passageway defining members, the fishing line passageway defining members interfitting with one another when the first and second housing sections are interconnected to define a fishing line receiving passageway from the exterior of the body, through the body, and to the exterior of the body;

wherein the first and second housing sections are pivotable relative to one another when the first and second housing sections are interconnected, the apparatus comprising a closure which is shiftable as the first and second housing sections pivot relative to one another from a closed position wherein the closure closes the at least one fish attractant dispersing opening and to at least one second open position wherein the closure at least partially does not block the at least one fish attractant dispersing opening such that the at least one fish attractant dispersing opening is at least partially open; and wherein there are plural of said second open positions which vary one from another by the extent to which the closure blocks the at least one fish attractant dispersing opening to thereby vary the extent to which the at least one fish attractant dispersing opening is open.

2. An apparatus according to claim 1 wherein the first and second housing sections comprise indicia for visually indicating the extent to which the at least one fish attractant dispersing opening is open.

3. An apparatus according to claim 2 wherein the first housing section comprises a first visual indicia and the second housing section comprises a second visual indicia, the first and second visual indicia shifting relative to one another as the first and second housing sections pivot relative to one another, and wherein the relative positions of the first and second visual indicia indicate the position to which the first and second housing sections have shifted to thereby indicate the extent to which the at least one fish attractant dispersing opening is open.

4. An apparatus according to claim 3 wherein the first and second housing sections interfit and pivot relative to one another along a joint extending about the periphery of the body, wherein the first visual indicia is carried by the first housing section at a location adjacent to the joint and wherein the second visual indicia is carried by the second housing section at a location adjacent to the joint.

5. An apparatus according to claim 4 wherein the first visual indicia comprises a first raised projection formed as a part of the first housing section, the first passageway defining member also being formed as part of the first housing section, wherein the second visual indicia comprises a second raised projection formed as a part of the second housing section, and wherein the second passageway defining member is also formed as a part of the second housing section.

6. An apparatus according to claim 5 wherein the first and second housing sections are each of plastic.

7. An apparatus according to claim 5 wherein one of the first and second passageway defining members has a first end portion and the other of the first and second passageway defining members has a second end portion, the first end portion being sized for insertion into the second end portion and the second end portion being sized to receive the first end portion when the first and second housing sections are interconnected.

8. An apparatus for dispensing fish attractant comprising:
a body having an exterior and comprising first and second housing sections, the first and second housing sections being detachably interconnected, the body comprising a fish attractant containing chamber;
at least one fish attractant dispersing opening communicating from the chamber and to the exterior of the body;
the first and second housing sections comprising respective first and second passageway defining members, the passageway defining members interfitting with one another when the first and second housing sections are interconnected to define a passageway from the exterior of the body, through the body, and to the exterior of the body;
wherein the first and second housing sections interfit and pivot relative to one another along a joint extending about the periphery of the body, wherein first visual indicia is carried by the first housing section at a location adjacent to the joint and wherein second visual indicia is carried by the second housing section at a location adjacent to the joint; and
wherein one of the first and second passageway defining members has a first end portion and the other of the first and second passageway defining members has a second end portion, the first end portion being sized for insertion into the second end portion and the second end portion being sized to receive the first end portion when the first and second housing sections are interconnected.

9. An apparatus according to claim 8 wherein one of the first and second housing sections comprises a first peripheral lip, the first lip comprising an interior engagement surface, wherein the other of the first and second housing sections comprises a second peripheral lip, the second lip comprising an exterior engagement surface, the interior and exterior engagement surfaces engaging one another upon insertion of the said other of the first and second housing sections into the said one of said first and second housing section when the first and second housing sections are interconnected.

10. An apparatus according to claim 9 wherein the said one of said housing sections comprises a stop positioned to limit the extent of insertion of the said other of the first and second housing sections in the said one of said housing sections.

11. An apparatus according to claim 9 wherein the first and second lips define plural fish attractant dispersing openings which are completely out of alignment with one another when the first and second housing sections are in a closed position to thereby block the flow of fish attractant through the fish attractant dispersing openings, the fish attractant dispersing openings being at least partially aligned when the first and second housing sections are pivoted to a fish attractant dispersing open position to provide a path for dispersing fish attractant from the chamber and through the at least partially aligned fish attractant dispersing openings.

12. An apparatus according to claim 11 wherein the extent of alignment of the fish attractant dispersing openings of the first lip and the fish attractant dispersing openings of the second lip is varied to vary the extent to which the fish attractant dispersing openings are open.

13. An apparatus according to claim 12 comprising first and second indicia carried by the respective first and second housing sections adjacent to respective first and second lips, the first and second indicia shifting relative to one another as the first and second housing sections are pivoted to align the fish attractant dispersing openings of the first and second lips, wherein the relative position of the first and second indicia provides a visual indication of the extent of alignment of the fish attractant dispersing openings of the respective first and second lips to thereby indicate the extent to which the fish attractant dispersing openings are open.

14. An apparatus according to claim 13 wherein the first and second lips are located at a central position of the interconnected first and second housing sections.

15. An apparatus according to claim 14 wherein the first and second housing sections form a generally ovoidal body when interconnected.

16. An apparatus according to claim 15 wherein there are only two of said first and second housing sections which form the body.

17. An apparatus for dispensing fish attractant comprising:
- a body having an exterior and comprising first and second housing sections, the first and second housing sections being detachably interconnected, the body comprising a fish attractant containing chamber;
- at least one fish attractant dispersing opening communicating from the chamber and to the exterior of the body;
- the first and second housing sections comprising respective first and second passageway defining members, the passageway defining members interfitting with one another when the first and second housing sections are interconnected to define a passageway from the exterior of the body, through the body, and to the exterior of the body;
- wherein one of the first and second housing sections comprises a first peripheral lip, the first lip comprising an interior engagement surface, wherein the other of the first and second housing sections comprises a second peripheral lip, the second lip comprising an exterior engagement surface, the interior and exterior engagement surfaces engaging one another upon insertion of the said other of the first and second housing sections into the said one of said first and second housing section when the first and second housing sections are interconnected;
- wherein the first and second lips define plural fish attractant dispersing openings which are completely out of alignment with one another when the first and second housing sections are in a closed position to thereby block the flow of fish attractant through the fish attractant dispersing openings, the fish attractant dispersing openings being at least partially aligned when the first and second housing sections are pivoted to a fish attractant dispersing open position to provide a path for dispersing fish attractant from the chamber and through the at least partially aligned fish attractant dispersing openings; and
- wherein the first and second lips are located at a central position of the interconnected first and second housing sections.

18. An apparatus according to claim 17 comprising first and second indicia carried by the respective first and second housing sections adjacent to respective first and second lips, the first and second indicia shifting relative to one another as the first and second housing sections are pivoted to align the fish attractant dispersing openings of the first and second lips, with the relative position of the first and second indicia providing a visual indication of the extent of alignment of the fish attractant dispersing openings of the respective first and second lips to thereby indicate the extent to which the fish attractant dispersing openings are open.

19. An apparatus according to claim 17 wherein the extent of alignment of the fish attractant dispersing openings of the first lip and the fish attractant dispersing openings of the second lip is varied to vary the extent to which the fish attractant dispersing openings are open.

20. An apparatus according to claim 17 wherein the first and second housing sections comprising respective first and second passageway defining members in the form of tubular projections, the passageway defining members interfitting with one another when the first and second housing sections are interconnected to define a passageway from the exterior of the body, through the body, and to the exterior of the body.

21. An apparatus according to claim 20 wherein one of the first and second passageway defining members has a first end portion and the other of the first and second passageway defining members has a second end portion, the first end portion being sized for insertion into the second end portion and the second end portion being sized to receive the first end portion when the first and second housing sections are interconnected.

* * * * *